Nov. 12, 1935.  D. C. KLAUSMEYER  2,020,785
INTERLOCKED PROPELLING AND CLAMPING MEANS FOR MOBILE DRILLS
Original Filed Jan. 13, 1931  4 Sheets-Sheet 1
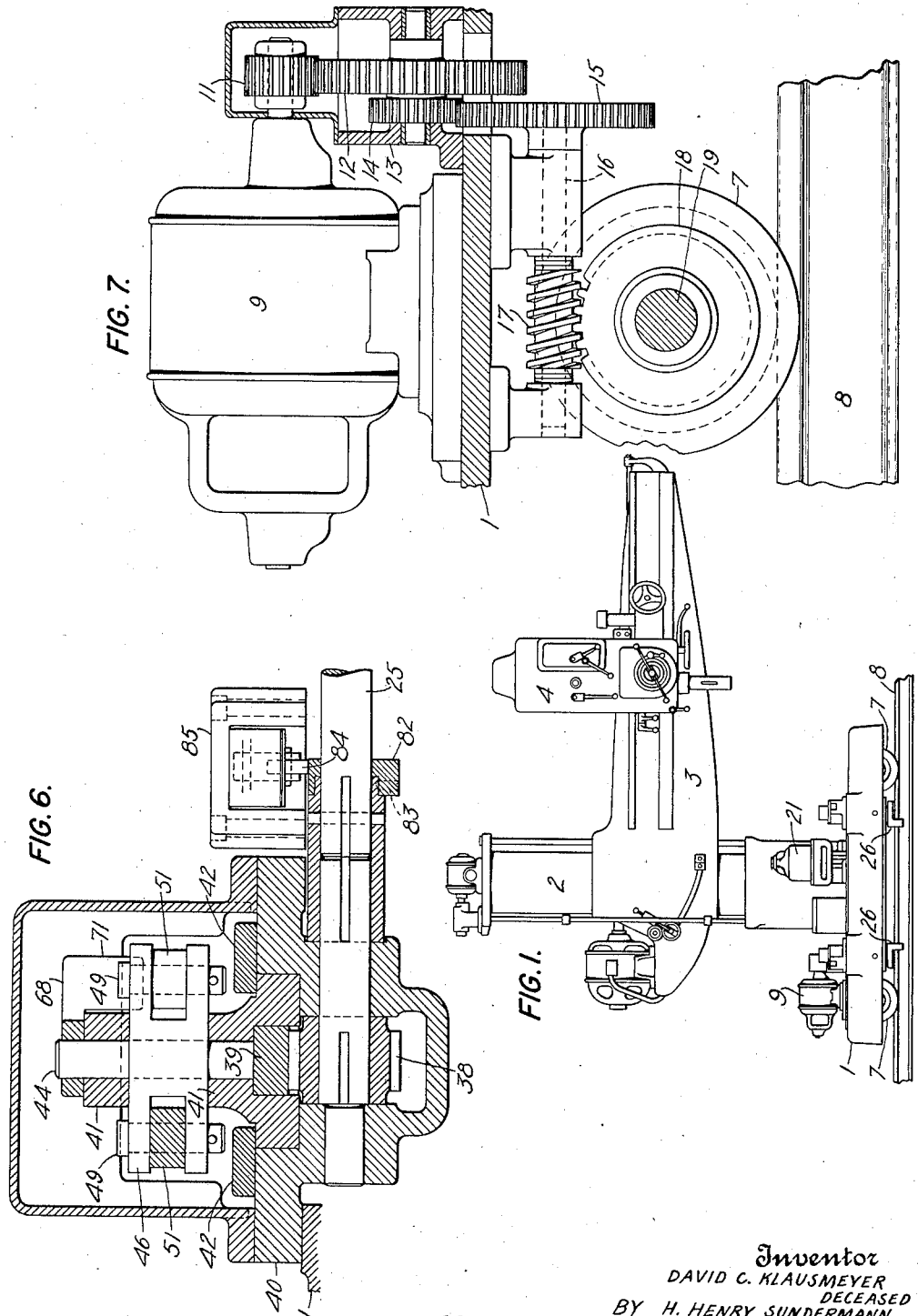
Inventor
DAVID C. KLAUSMEYER
DECEASED
BY H. HENRY SUNDERMANN
EXECUTOR
By Attorneys
Nathan, Bowman & Helfrich

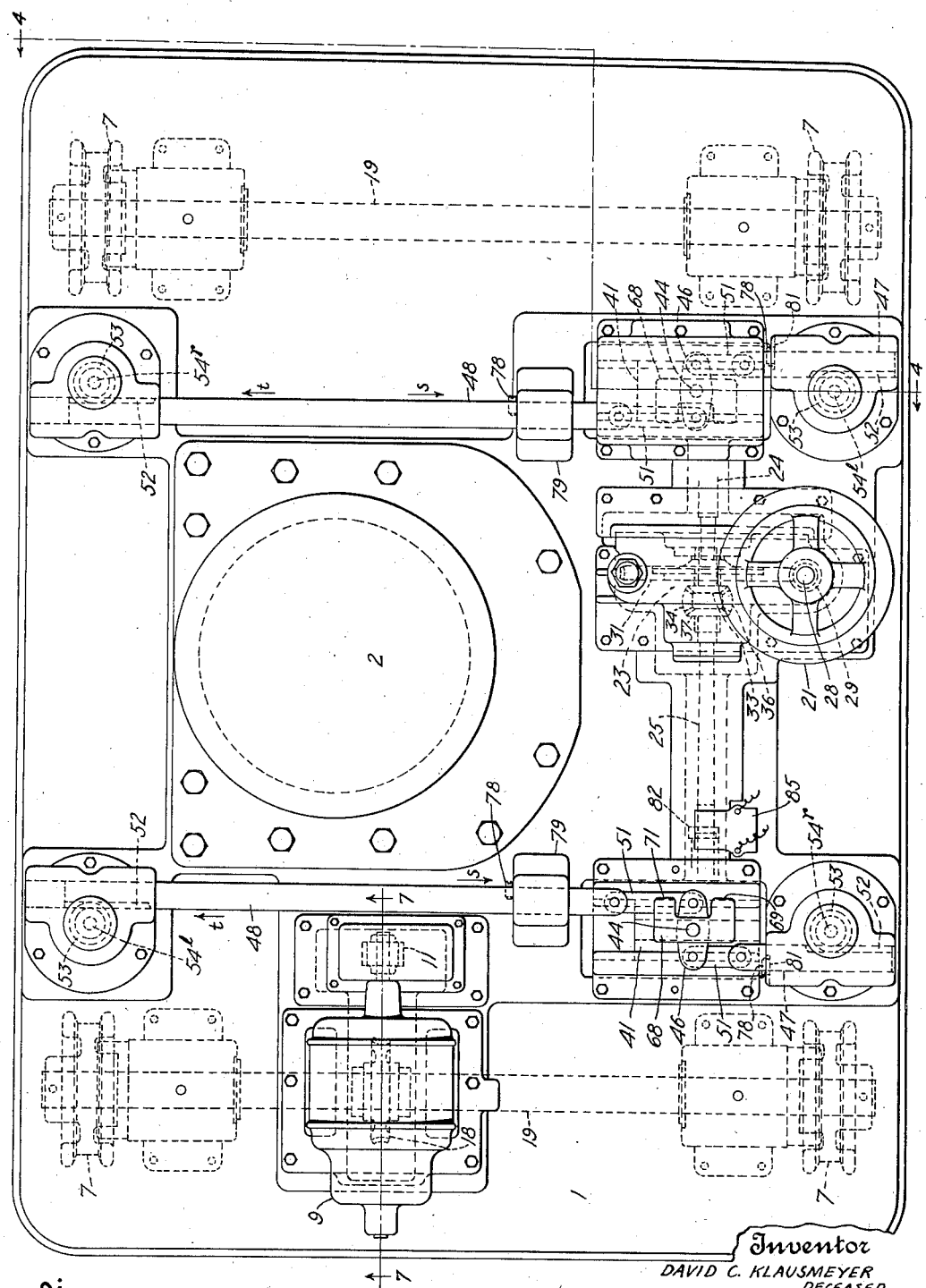

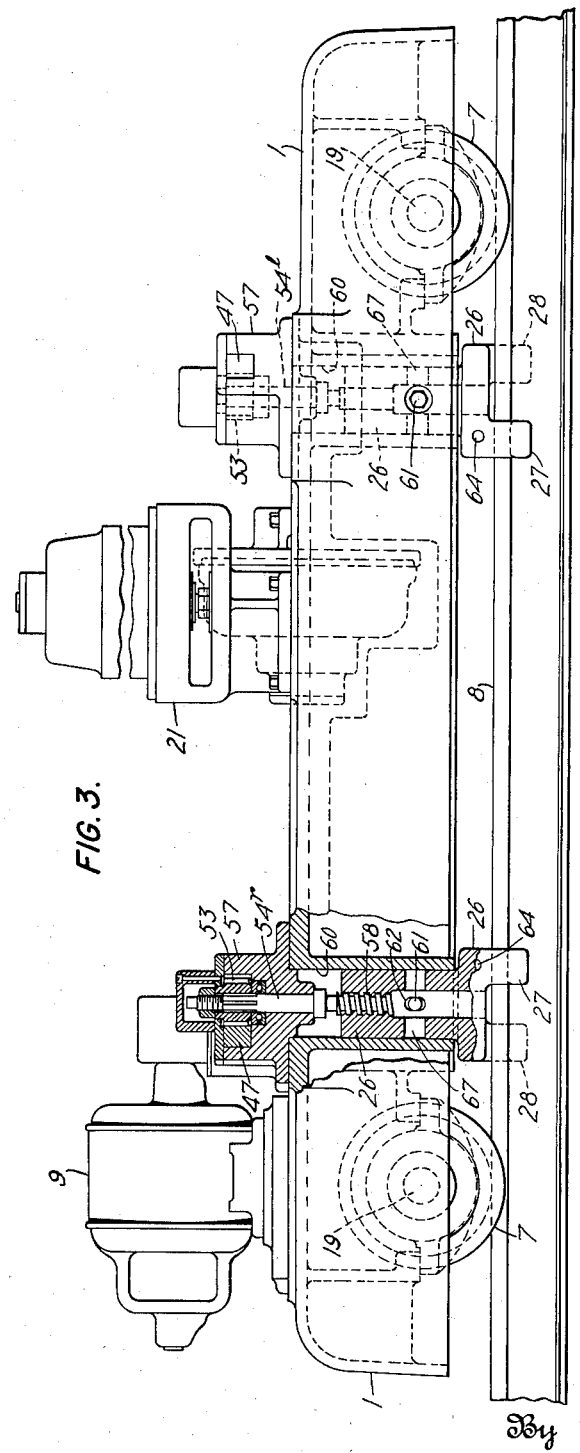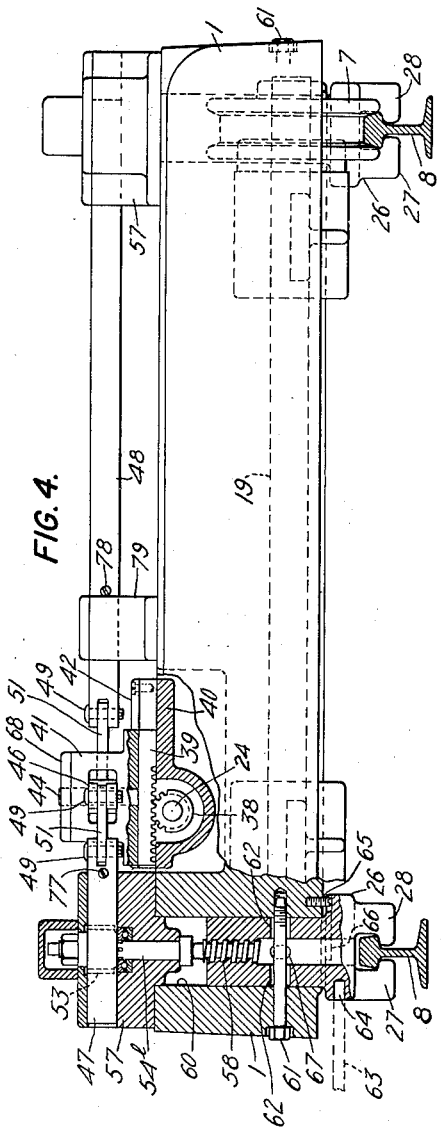

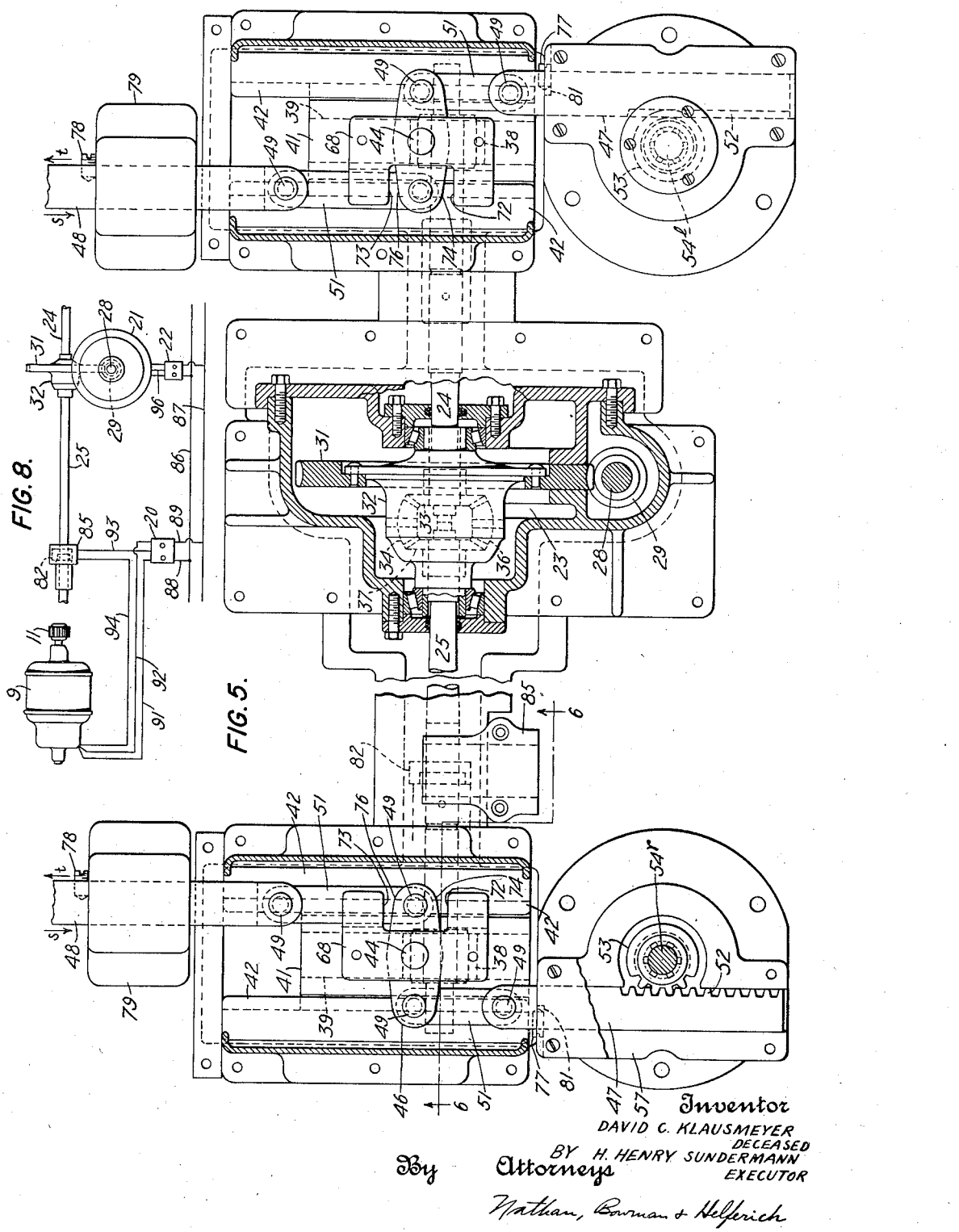

Patented Nov. 12, 1935

2,020,785

UNITED STATES PATENT OFFICE 2,020,785

INTERLOCKED PROPELLING AND CLAMPING MEANS FOR MOBILE DRILLS

David C. Klausmeyer, deceased, late of Hyde Park, Cincinnati, Ohio, by H. Henry Sundermann, executor, Cincinnati, Ohio, assignor to The Cincinnati Bickford Tool Company, Cincinnati, Ohio, a corporation of Ohio Original application January 13, 1931, Serial No. 508,453. Divided and this application March 21, 1933, Serial No. 661,944

6 Claims. (Cl. 77—28)

This application is a division of Patent No. 1,945,048 issued January 30, 1934. This invention deals with machine tools and it relates more particularly to means for propelling a machine tool on a suitable support, or track, and to improved means for clamping the machine to its support during a machining operation.

It is often necessary, in modern manufacturing, to perform a plurality of machining operations, such as drilling, upon a cumbersome work-piece which is too large to be placed upon the usual work-support of an ordinary stationary machine tool. For such operations it has been found advantageous to place the work-piece alongside a track supporting a mobile machine tool, such as a radial drill, and to move the machine relative to the work to enable it to perform all the required operations. From an initial position, a command over a wide area of the work-piece may be obtained due to the swinging movement of the radial arm about its column and the translatory movement of the tool-head on the arm. After all the drilling has been completed in that particular area, the machine may be moved farther along the work-piece to a position covering a corresponding area. This operation may be repeated until the drilling is completed upon the entire work-piece.

One of the objects of this invention is to provide means, preferably power actuated, for propelling the machine tool along its support whereby movement of the machine relative to the work-piece may be effected with great facility and with a minimum of effort on the part of the operator.

To insure precision in the finished work-piece it is essential that the machine tool be rigidly secured to its support during a machining operation. This is particularly true in the case of radial arm drilling machines in which the tool frequently engages the work with great pressure a considerable distance to one side of the machine base, the pressure of the tool on the work reacting through the long radial arm and tending to overturn the entire machine.

Another object of this invention, therefore, is to provide improved clamping means whereby the machine base may be quickly, easily, and effectively clamped to its support and held thereagainst in opposition to the upwardly directed stresses incident to a machining operation. This object has been attained by the provision of improved clamping means including a plurality of sets of clamping devices, each adapted to engage beneath the support for the machine base, and the provision of a common means including an electric motor for actuating all of the clamping devices. Equalizing devices embodied in said clamping means insure that all of said clamp devices will be set firmly and equally and other means insure that all of the clamps will be completely opened. Preferably the common actuator for the clamping device is in the nature of a power actuated prime mover, such for example as an electric motor.

Still another object of this invention is to provide a safety interlock between the propelling means and the clamping means whereby they may not be effective simultaneously. This is particularly desirable when both the propelling means and the clamping means are power actuated, inasmuch as it prevents the simultaneous application of two forces, acting in opposition, which otherwise might result in breakage or damage to parts of the mechanism. This object has been attained by so constructing and combining the propelling means and the clamping means that actuation of the clamping means, to close the clamps, automatically renders the propelling means ineffective and maintains it ineffective so long as the clamps are closed. In constructions where the propelling means is actuated by an electric motor the safety device conveniently may comprise a cut-out switch actuated by some portion of the clamping means.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which:—

Figure 1 is a side elevation of a mobile radial drill incorporating this invention. Fig. 2 is a plan view of the translatable base thereof, showing the clamping mechanisms, equalizing devices, and interlock. Fig. 3 is a side elevation of the base, partly broken away to show a sectional elevation of one of the rail clamping mechanisms. Fig. 4 is a view substantially on the line 4—4 of Fig. 2, showing a sectional elevation of another one of the clamping mechanisms. Fig. 5 is a fragmentary plan view, partly broken away to show portions of the equalizing and clamping devices. Fig. 6 is a sectional view on the line 6—6 of Fig. 5. Fig. 7 is a sectional view substantially on the line 7—7 of Fig. 2, showing means for propelling the machine along the supporting rails. Fig. 8 is a diagrammatic view illustrating the electric circuits to the propelling and clamping motors and showing the safety interlock between the two.

Referring more particularly to the drawings, the invention is disclosed as embodied in a radial drill comprising a base 1, an upright column 2, supporting a radial arm 3, on which is mounted a translatable tool-head 4. The base 1 carries a plurality of wheels 7 which are fitted to rails 8 thereby permitting the machine to be moved therealong.

The propelling power is preferably provided by a reversible motor 9, supported upon the base 1, and a suitable transmission serves to transmit the power from the motor to the drive wheels at the rear end of the base. This transmission consists of a gear 11 mounted upon the motor shaft and in mesh with a relatively large gear 12 journaled in bearings provided by a gear housing 13. Fixed to gear 12, is a smaller gear 14 in mesh with a large gear 15 secured upon the forward end of a shaft 16 journaled in bearings appending from the underside of the base 1. A worm 17 fixed to the shaft 16, meshes with a worm-wheel 18 secured upon a live axle 19, which, in turn, transmits the power to the driving wheels 7 at the rear end of the base. The translation in both forward and reverse directions is available by means of a switch 20, the connections therewith being shown in Fig. 8, and which will be described later.

A general description of the clamping mechanism will now be given. As seen in Fig. 2, the power for clamping is furnished by a motor 21, connected with differential gearing 23 of conventional form which serves to equalize the power transmitted to shafts 24 and 25 leading from the differential gearing to the clamping and equalizing mechanisms at the forward and rear ends of the base respectively. The mechanism for transmitting and equalizing the power coming from the shaft 24 with respect to clamping blocks 26 at the forward end of the base, and the linkage and gearing involved, will be presently explained. Then it will be seen that clamping jaws 27 and 28 may be elevated against the undersides of the head portions of the rails 8, thereby cooperating with the wheels 7 to provide a very rigid clamping mechanism. The clamping and equalizing mechanism at the rear end of the base is similar in construction and operation to that at the forward end. Therefore, a detailed description of one will suffice for both. By reversing the motor 21, the operator may unclamp the jaws after all the drilling is completed which is capable within the radius of the radial arm and the machine may then be translated along the rails to another desired position.

The connection between the motor 21 and the differential 23 is seen in Figs. 2 and 5, wherein the worm 29 is shown mounted upon the shaft 28 of the motor 21 meshing with a worm wheel 31 secured to a differential casing 32 loosely mounted upon the shaft 24. A bevel gear 33 mounted upon the shaft 24 is in mesh with two bevel gears 34 and 36 journaled upon stub shafts fixed upon the casing 32 and which in turn mesh with a bevel gear 37 mounted on the shaft 25. Thus it is obvious that the power furnished to the clamping and equalizing mechanisms at both ends of the base is itself equally distributed by the differential 23.

As before described, the clamping and equalizing mechanisms at the forward and rear ends of base 1 are substantially identical, and consequently the same numbers are used to indicate similar members at both ends, and also for the clamps at both sides of the base, except for the exponents $l$ and $r$ as later explained.

To transmit the power from the shafts 24 and 25 to the equalizing and clamping mechanisms, pinions 38 are mounted thereon in mesh with racks 39 secured to the underside of blocks 41 slidable within guide-ways provided by brackets 40 secured upon the machine base. Straps 42 secured upon the brackets overlie the marginal portions of the slide blocks to prevent upward movement of the latter. The connection from the blocks 41 to the clamping jaws 27 and 28 is provided by pins 44 secured to the blocks upon which levers 46 are loosely fitted and connect with slidable rack-bars 47 and 48 by pins 49 and links 51. Thereby the pressure exerted upon the rack-bars is equalized. The outer end of the bars 47 and 48 are formed with rack-teeth 52 adapted to mesh with pinions 53 mounted upon a pair of vertical screw-shafts $54^l$ and $54^r$ supported by ball-thrust bearings 56 located beneath the pinions and within the blocks 57 fixed upon the base. The screw-shafts $54^l$ and $54^r$ are provided with threaded portions 58 which engage the complementally threaded cylindrical blocks 26 slidable within bores 60 in the base, and which have integral therewith the oppositely extending clamping jaws 27 and 28 adapted to engage the undersides of the rail heads.

To prevent turning of the blocks 26, whereby the jaws 27 and 28 might become disengaged from the rails, bolts 61, Figs. 3 and 4, are adapted to pass through the side walls of the base and also through diametrically cut slots 62 in the screw-shafts $54^l$ and $54^r$ and extend into threaded bores in the adjoining walls of the base. Preparatory to placing the machine upon or lifting it from the rails, the clamping jaws 27 and 28 are moved transversely of the rail to provide between them a space of greater width than the width of the rail head. This may be done by removing the bolts 61 and then inserting any suitable tool, such as a hand bar 63, into the bores 64, in the blocks 26 and rotating the blocks throughout a 90° arc. Further rotation is prevented by screws 65 which protrude from the base, designed to engage the stop-walls or end portions of grooves 66 also cut within the blocks 26. When so in contact, diametrical slots 67, disposed perpendicularly to slots 62, are in alignment with the bolt holes in the base and the bolts 61 may again be inserted to insure that the jaws 27 and 28 may not become accidentally swung underneath the rail heads.

It will be noted in Fig. 2 that the rack-bars 47 and 48 engage the pinions 53 at opposite sides with respect to a plane through the axes of the pinions. This is to permit the screw-shafts $54^l$ and $54^r$ to elevate or lower the blocks 26 upon the respective movement of the pins 44 in the direction of either arrows $t$ or $s$, and is accomplished by means of the before mentioned right and left handed thread on the screw shafts.

Therefore, to briefly summarize the chief features of the clamping operation, it is seen that when the operator closes the switch 22 thereby starting the clamping motor 21, the shafts 24 and 25, Fig. 2, are turned, thereby causing the pinions 53 at the forward and rear ends of the base to actuate the rack-bars 47 and 48 in the direction indicated by the arrows t. By means of the pins 44 and levers 46, the rack-bars 47 and 48 are also moved in the same direction, and thereupon the screw-shafts 54¹ and 54ʳ elevate the blocks 26 causing the clamping jaws 27 and 28 to engage the underside of the rail heads, completing the clamping operation.

To insure that all of the clamps will be equally tightened, plates 68 are secured to the blocks 41, and have downwardly extending arms 69 and 71 providing surfaces 72 and 73 respectively adapted to engage surfaces 74 and 76 of the levers 46 and thereby limit their swinging movement. For example, in Figs. 2 and 5, should that clamp located at the rear end of the base and at the side indicated by screw shaft 54ʳ become retarded, lever 46 would cause the rack-bar 48 to move in a direction indicated by the arrows t until the surface 76 of the lever 46 engages the surface 73 of the abutment 68. The power would then be exerted against the retarded clamp, forcing it to become equally tightened, and the lever 46 would then cause rack-bar 48 to continue to actuate the clamp at the opposite side of the base until both clamps become secured. In like manner, the surface 72 of the arm 69 and the surface 74 of the lever 46 are designed to prevent the lever from swinging too far in the opposite direction when the operation is reversed. Accordingly it is seen that an important feature of the abutments 68 is that they prevent the levers 46 from becoming swung in substantial alignment with the rack-bars 47 and 48 and thereby be apt to offer resistance, while in this endwise position, when it is desired to reverse the operation and disengage the clamping jaws from the rails.

It is seen that when any one clamp is tightened, and if for any reason the opposite clamp is not equally tightened, that the rack-bar connecting with the tightened clamp cannot be further actuated, and that this fact in itself acts as an abutment permitting the force to be exerted entirely upon the clamping members at the opposite side of the base, due to the equalizing action of the levers 46 as before described.

Similarly, other abutments are desirable to insure that the jaws of all of the clamping blocks are disengaged from the rails upon unclamping as well as upon clamping. Such abutments are provided by suitable screws 77 and 78 carried respectively by the rack-bars 47 and 48 and adapted to limit the movement of the bars in a direction, indicated by the arrows s in Figs. 2 and 5, by coming in respective contact with blocks 79 secured upon the base 1, and the endwalls of slot-ways 81 cut in the blocks 57. Using the same example to illustrate the operation of these abutments in unclamping that was used in describing the similar operation in clamping, it is obvious that, should the particular clamp located at the rear of the base and engaged with the screw-shaft 54ʳ become so tightened that it offered resistance in unclamping, the lever 46 would cause the rack-bar 48 to move in the direction of the arrows s until prevented by the screw 78 engaging the block 79; at which point the jaws of the opposite clamping block would be disengaged from the rails. The power would then be exerted against the retarded clamp forcing it to move until the screw 77 engages the end-wall of the slot-way 81, at which point both clamps would be equally disengaged. In like manner, the screw 77 insures proper operation if the opposite clamping block should set. The mechanism at the forward end of base is similarly provided with abutments 68, screws 78 and blocks 79, so that the construction and operation of the clamping and equalizing means at both ends substantially coincide.

To insure that the operator cannot accidentally actuate both translatory and clamping power simultaneously, an automatically acting interlock between the two is provided. Upon shaft 25, Fig. 6, is a cam 82 secured by a set-screw 83 and adapted to engage an arm 84 of a line or cut-out switch 85 interposed in the current line to the propelling motor 9. When the operator starts the motor 21, preparatory to clamping, the shaft 25 is turned, as explained above. The cam 82 thereupon actuates the switch member 84, thereby breaking the circuit to the propelling motor and preventing a continued application of the propelling power. To unclamp, the operator reverses the rotation of the motor 21, whereupon the action is obviously reversed, and the motor 9 is again free to provide translatory motion.

For a better understanding of this safety device, attention is called particularly to the diagrammatic drawings, Fig. 8. The current may be supplied from suitable conduits 86 and 87, through leader wires 88 and 89 running to the switch 20. Lines 91 and 92 lead directly from the switch 20 to the motor 9. The connection from the switch 20 to the line switch in the interlock and therefrom to the motor 9 is through lines 93 and 94 respectively. Consequently, when the line switch 85 is closed, the lines 93 and 94 are always operative whenever the propelling motor is rotating in either a forward or reverse direction. Since the interlock may make or break the circuit passing through the lines 93 and 94, the motor 9 can operate only when the cam 82 has closed the switch in the interlock.

The clamp control switch 22 is constructed and connected in a similar manner with respect to the motor 21 except that the line 96, which corresponds in operation to the lines 93 and 94, leads directly from the switch to the motor.

Another feature of this invention resides in the construction of the propelling means, the clamp actuating means and the individual equalizing devices embodied in the clamping means, as individual units adapted to be built complete and subsequently secured in their operative positions upon the machine base. Such unit construction affords decided advantages both in manufacture and assembly and enables any unit to be removed for repair, or replaced by a similar unit, at a minimum of expense and labor.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, it is claimed as new and desired to secure the following combinations and elements, or equivalents thereof, by Letters Patent of United States:—

1. A mobile radial drill combining a base; wheels on said base adapted to engage a fixed support; power means, including an electric motor carried by said base and an electric circuit for said motor, for rotating said wheels thereby to propel said base on said support; a manual control for said power means; means, acting in opposition to said wheels, to clamp said base to said support in any position of adjustment, thereby to lock the machine to the base and prevent it from being moved both vertically and horizontally; an electric motor carried by said base and an electric circuit therefor for actuating said clamping means; a manual control for said clamping motor; and an electric interlock between said motors comprising a cut-out switch in the circuit of one of said motors and means actuated by the other motor for opening said switch, thereby to prevent the propelling means and the clamping means being operative simultaneously.

2. A mobile drill combining a base adapted to be mounted on a support; wheels carried by said base and engaging said support; a first electric motor mounted on said base; an electric circuit connected with said motor, a driving connection between said motor and a pair of said wheels for propelling said base on said support; a plurality of clamp devices carried by said base for securing said base to said support; a second electric motor carried by said base; an operative connection including a shaft between said second motor and said clamp devices; a cut-out switch embodied in said electric circuit; and means actuated by said shaft in its initial clamp closing movement for opening said cut-out switch and thereby rendering said first electric motor inoperative when said clamps are closed.

3. A mobile radial drill combining a base adapted to be mounted on a support; an upright column secured thereto; an arm projecting horizontally from said column; a tool-head supported on said arm and provided with a vertically reciprocating tool; electrically driven power means including an electric motor carried by said base for propelling said base on said support; manually controlled electric power actuated means including a clamping element located beneath said support and adapted to be moved vertically into contact therewith to clamp said base to said support and to prevent upward movement of the machine under the influence of the machining stresses; and means including a circuit breaker in series with said propelling motor and actuated by the closing movement of said clamp actuating means to break the circuit to said propelling motor thereby to prevent said propelling means and said clamping means being operative simultaneously.

4. A mobile drill combining a base adapted to be mounted on a support; wheels carried by said base and engaging said support; a first electric motor mounted on said base; an electric circuit connected with said motor; a driving connection between said motor and a pair of said wheels for propelling said base on said support; a plurality of clamp devices carried by said base for securing said base to said support; a second electric motor carried by said base; an operative connection including a rotatable shaft between said second motor and said clamp devices; a cam on said shaft; a manually actuable control switch embodied in said electric circuit for selectively effecting forward and reverse rotation of said propelling motor and thereby forward and reverse translation of said mobile drill; and a circuit-breaker embodied in said electric circuit and adapted to be actuated by said cam thereby to break said circuit and render said propelling motor inoperative by the clamp closing movement of said second electric motor.

5. A mobile drill combining a base adapted to be mounted on a support; wheels carried by said base and engaging said support; a first electric motor mounted on said base; an electric circuit connected with said motor; a driving connection between said motor and a pair of said wheels for propelling said base on said support; a plurality of clamp devices carried by said base for securing said base to said support; a second electric motor carried by said base; an operative connection between said second motor and said clamp devices; a control switch embodied in said circuit; a normally open safety switch embodied in said circuit; and means controlled by the clamp actuating means in its clamp opening movement to close said safety switch thereby to permit said circuit to be rendered effective only after said clamps have been released.

6. A mobile drill combining a main base; wheels carried by said base and adapted to engage and travel on a supporting track whereby said mobile drill may be moved as a self-contained unit to selected positions on said track; a first electric motor mounted on said base; connections therefrom to one of said wheels for propelling said mobile drill on the supporting track; an electric control circuit for said motor and manually operable switch means therein for controlling the operation to move said mobile drill in forward or reverse directions; a plurality of clamp devices carried by said base for securing said base to said track in selected position; a second electric motor mounted on said base; connections from said second electric motor to each of said clamps for the operation thereof; an electric control circuit for said second motor including manually operable switch means therein for controlling clamping and unclamping operations; an auxiliary circuit breaker embodied in said electric circuit for said propelling motor; and a mechanically operable means in said clamp operating connections adapted to open said circuit breaker and render said propelling motor inoperative by the clamp closing movement of said clamping motor.

H. HENRY SUNDERMANN,
*Executor of the Last Will and Testament of David C. Klausmeyer, Deceased.*